(12) United States Patent
Tsukui

(10) Patent No.: US 9,815,503 B2
(45) Date of Patent: Nov. 14, 2017

(54) FRONT COWL FOR A SADDLE RIDE TYPE VEHICLE

(71) Applicant: HONDA MOTOR CO., LTD., Tokyo (JP)

(72) Inventor: Hiroaki Tsukui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 44 days.

(21) Appl. No.: 14/154,493

(22) Filed: Jan. 14, 2014

(65) Prior Publication Data

US 2014/0202782 A1 Jul. 24, 2014

(30) Foreign Application Priority Data

Jan. 19, 2013 (JP) ................. 2013-007947

(51) Int. Cl.
| | |
|---|---|
| B62J 17/00 | (2006.01) |
| B62D 35/00 | (2006.01) |
| B62J 6/02 | (2006.01) |
| B62J 17/02 | (2006.01) |
| B62J 25/00 | (2006.01) |
| B60K 11/08 | (2006.01) |

(52) U.S. Cl.
CPC .............. *B62D 35/00* (2013.01); *B60K 11/08* (2013.01); *B62J 6/02* (2013.01); *B62J 17/00* (2013.01); *B62J 17/02* (2013.01); *B62J 25/00* (2013.01)

(58) Field of Classification Search
CPC ........ B60K 11/08; B62D 35/00; B62D 37/02; B62J 6/02; B62J 6/00; B62J 17/00; B62J 17/02; B62J 17/06; B62J 25/00
See application file for complete search history.

(56) References Cited

U.S. PATENT DOCUMENTS

| | | | | |
|---|---|---|---|---|
| 4,709,774 A | * | 12/1987 | Saito et al. | .................... 180/229 |
| 4,830,135 A | * | 5/1989 | Yamashita | ............. B60K 11/08 |
| | | | | 123/41.7 |
| 4,911,494 A | * | 3/1990 | Imai et al. | .................... 296/78.1 |

(Continued)

FOREIGN PATENT DOCUMENTS

| | | | |
|---|---|---|---|
| EP | 2 042 415 | 4/2009 | |
| EP | 2228288 A2 | * 9/2010 | ............. B62J 17/00 |

(Continued)

OTHER PUBLICATIONS

2011 Honda CBR250r Owners Manual (copyright 2010).*

(Continued)

*Primary Examiner* — James A Shriver, II
*Assistant Examiner* — Steve Clemmons
(74) *Attorney, Agent, or Firm* — Rankin, Hill & Clark LLP

(57) ABSTRACT

An air outlet is formed on each side surface of a front cowl covering a front portion of a vehicle body. The air outlet is located near and on the front side of a middle position defined by the half of the longitudinal length L of the front cowl. Left and right air inlets are formed near a headlight provided on the front surface of the front cowl. A running wind is introduced into the air inlets, passed through the inside of the front cowl, and discharged from the air outlets. The running wind flowing inside the front cowl is disturbed by the running wind discharged from the air outlets, thereby separating the running wind from each side surface of the front cowl.

10 Claims, 6 Drawing Sheets

(56) References Cited

U.S. PATENT DOCUMENTS

| | | | | |
|---|---|---|---|---|
| 4,913,256 | A * | 4/1990 | Sakuma | F02B 61/02 |
| | | | | 180/229 |
| 4,964,484 | A * | 10/1990 | Buell | B62J 17/00 |
| | | | | 180/219 |
| 5,330,029 | A * | 7/1994 | Yoshimura | B62J 17/00 |
| | | | | 180/219 |
| 5,577,570 | A * | 11/1996 | Shiohara et al. | 180/219 |
| 7,537,077 | B2 * | 5/2009 | Nakashima et al. | 180/229 |
| 7,556,115 | B2 * | 7/2009 | Iwanaga | B62J 99/00 |
| | | | | 180/219 |
| 7,674,023 | B2 * | 3/2010 | Ohira | 362/475 |
| 7,794,011 | B2 * | 9/2010 | Kjellgren et al. | 296/180.1 |
| 7,850,221 | B2 * | 12/2010 | Nakata et al. | 296/78.1 |
| 8,230,958 | B2 * | 7/2012 | Takahashi | B62K 11/04 |
| | | | | 180/68.1 |
| 2006/0087144 | A1 | 4/2006 | Kamimura et al. | |
| 2007/0257478 | A1 | 11/2007 | Metzikis | |
| 2011/0149587 | A1* | 6/2011 | Hayashi et al. | 362/520 |
| 2012/0314435 | A1* | 12/2012 | Hoashi et al. | 362/476 |

FOREIGN PATENT DOCUMENTS

| | | | |
|---|---|---|---|
| EP | 2343233 A1 * | 7/2011 | |
| GB | 2404642 A * | 2/2005 | B62J 17/00 |
| JP | 2007-261537 | 10/2007 | |
| JP | 2009-083679 | 4/2009 | |
| JP | 2011-143916 | 7/2011 | |
| JP | 2011143917 A * | 7/2011 | |
| JP | 2011-152847 | 8/2011 | |
| JP | 2011-230649 | 11/2011 | |
| JP | 2012-153275 | 8/2012 | |
| JP | 2012-183955 | 9/2012 | |

OTHER PUBLICATIONS

Two Photos of Honda ST1100 motorcycle, Honda Motor Company ca. 1999 model year, retrieved from internet on Mar. 6, 2017.*
Photo of side fairing of Ducati ST4S motorcycle, model manufactured from 2001-2006, retrieved from internet on Mar. 6, 2017.*

* cited by examiner

FRONT COWL FOR A SADDLE RIDE TYPE VEHICLE

BACKGROUND OF THE INVENTION

Field of the Invention

The present invention relates to a saddle ride type vehicle having a knee grip part and a front cowl, and more particularly to such a vehicle which can improve turning performance at the start of turning and can also reduce the influence of a crosswind.

Description of Related Art

It is known that a rider straddles a seat in a saddle ride type vehicle such as a motorcycle to grip the side surface of a fuel tank or the like with the rider's knees and that a front cowl for covering the front side of the vehicle is provided to straighten a running wind, thereby reducing a running resistance.

Further, it is also known that a headlight is located so as to be surrounded by the front portion of the front cowl and an air inlet for introducing a running wind is provided in the vicinity of the headlight, wherein the running wind introduced from the air inlet into the inside of the front cowl is supplied as an intake air to an engine (see Japanese Patent Laid-Open No. 2007-261537).

In the case that each side surface of the front cowl is long, there is a possibility that a phenomenon called sticking of a running wind may occur, causing a resistance to leaning of the vehicle at the start of turning. Because of this resistance, it may be difficult to change the attitude of the vehicle body. Further, the influence of a crosswind may also be increased.

It is therefore an object of the present invention to improve the structure of the front cowl to thereby improve turning performance at the start of turning and reduce the influence of a crosswind.

SUMMARY OF THE INVENTION

In accordance with the present invention, there is provided a saddle ride type vehicle including a knee grip part adapted to be gripped by the knees of a rider; and a front cowl for covering the front side of the vehicle to straighten a running wind, wherein each side surface of the front cowl extends from the front side of a handlebar to the knee grip part in the longitudinal direction of the vehicle; the front portion of the front cowl is provided with left and right air inlets for introducing a part of the running wind; and the left and right side surfaces of the front cowl are formed with left and right air outlets located on each side surface of the front cowl and on the rear side of the left and right air inlets, respectively. The running wind introduced from the front side of the front cowl into the inside of the front cowl is discharged from the air outlets to the outside. Accordingly, the running wind sticking to each side surface of the front cowl can be separated from each side surface of the front cowl by the running wind discharged from the air outlets. As a result, the resistance to leaning of the vehicle body at the start of turning can be reduced. Further, the influence of a crosswind can also be reduced.

In further accordance with the present invention, each air outlet is located on the front side of a middle position defined by the half of the longitudinal length of each side surface of the front cowl. Accordingly, the separation of the running wind from each side surface of the front cowl can be made more reliably and quickly. As a result, the running performance can be improved.

In further accordance with the present invention, a rear end portion of each side surface of the front cowl is in contact with the knee grip part, and a rear edge portion located in contact with the knee grip part extends obliquely upward to the rear side as viewed in side elevation. Accordingly, the front cowl can be extended rearward of the rider's knees, so that the running wind can be guided to flow more effectively outside the rider's knees, thereby improving the ride comfort during running.

In further accordance with the present invention, the front portion of the front cowl surrounds a headlight; the left and right air inlets are formed on the left and right outer sides of the headlight; and each air inlet is provided with a guide portion for guiding the running wind introduced into each air inlet laterally outward toward the rear side, the guide portion being located near the headlight. Accordingly, the running wind entering each air inlet can be guided toward the corresponding air outlet in the front cowl. Furthermore, each guide portion is used as a part of a duct. Accordingly, no special duct is necessary except each guide portion in the inside space of the front cowl having a closed cross section, and the duct structure inside the front cowl can be made simple.

In further accordance with the present invention, the front cowl has a front surface located on the front side of the handlebar so as to be widened laterally toward the opposite ends of the handlebar; the left and right air inlets are formed on the left and right sides of a headlight portion of the headlight; the headlight includes left and right position lights extending upward; and the spacing between the left and right position lights is set larger than the spacing between the left and right air inlets. Accordingly, the duct spacing between the left and right air inlets can be reduced, so that the running wind can be introduced from the left and right air inlets with less air resistance in the lateral central area where a high wind pressure is applied. Further, the light spacing between the left and right position lights is set larger than the duct spacing between the left and right air inlets. Accordingly, the left and right position lights can be located with the large spacing, thereby improving the visibility.

In further accordance with the present invention, left and right turn signals projects from the left and right side surfaces of the front cowl; and the left and right turn signals are located on the front side of the left and right air outlets, respectively. Accordingly, the visibility of the turn signals can be improved. In addition, the wind discharged from the air outlets is not hindered by the turn signals, but can be made to flow smoothly.

In further accordance with the present invention, the saddle ride type vehicle includes a radiator located on the front side of an engine located below the knee grip part, wherein the radiator has a rectangular shape as viewed in front elevation and has a small thickness as viewed in side elevation; left and right radiator side covers are provided on the left and right sides of the radiator, respectively, so as to straighten the running wind to be introduced into the radiator and a warm air flow passed through the radiator; and each radiator side cover has an upper end, as viewed in side elevation, overlapped with each side surface of the front cowl which has a recessed portion for receiving each radiator side cover on the side surface thereof. Accordingly, the lateral distance between the left and right radiator side covers can be reduced to thereby reduce the air resistance. Furthermore, a feel of integration between each radiator side cover and the front cowl can be produced to improve the outside appearance.

The running wind passed under the lower surface of the front cowl serves to cool the radiator, and there is a case that a part of this running wind is not taken into the radiator from the front surface thereof, but changes its running direction upwardly to stay inside the front cowl.

In such a case that the running wind stays inside the front cowl, a force floating the front cowl is generated to cause a disturbance in running stability of the vehicle.

Even in this case, the running wind introduced from the air inlets on the front side of the front cowl functions to discharge the running wind staying in the front cowl from the air outlets. Accordingly, the force floating the front cowl can be reduced to thereby improve the running stability of the vehicle.

DETAILED DESCRIPTION OF THE PREFERRED EMBODIMENTS

Figure 1:
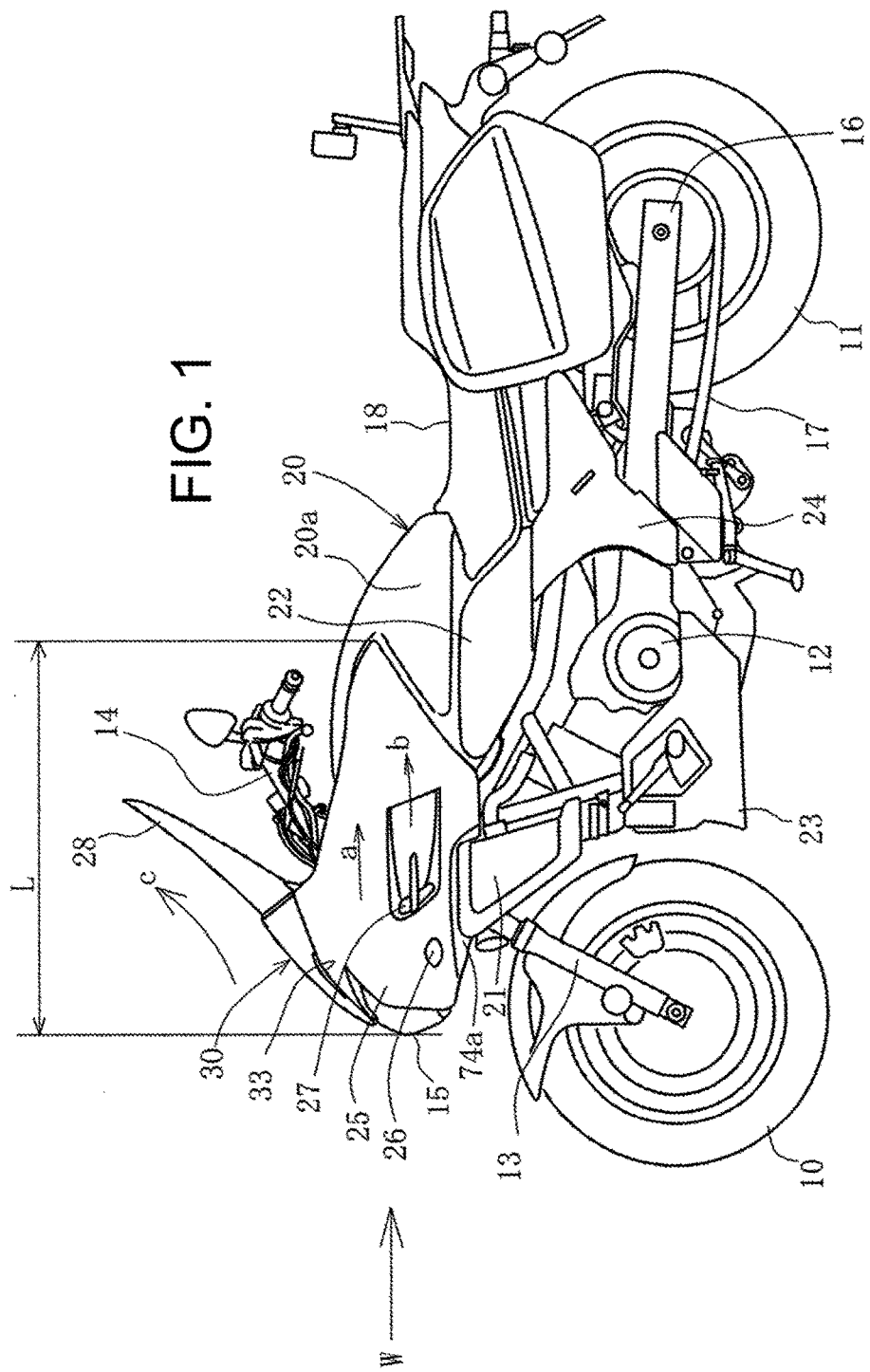
FIG. 1 is a left side view of a vehicle according to a preferred embodiment.

FIG. 1 shows the left side of a large-size motorcycle according to a preferred embodiment of the present invention. As shown in FIG. 1, an engine 12 is provided between a front wheel 10 and a rear wheel 11. The front wheel 10 is supported to the lower end of a front fork 13 and adapted to be steered by a bar handle type handlebar 14 provided above the engine 12. A headlight 15 is provided above the front fork 13.

The rear wheel 11 is supported to the rear end of a rear swing arm 16 and adapted to be driven by the engine 12 through a chain 17. A seat 18 adapted to be straddled by a rider is provided above the rear wheel 11.

A shelter 20 for covering a fuel tank or the like is provided between the handlebar 14 and the seat 18 above the engine 12. The shelter 20 is a substantially container-like cover member opening to the lower side. The shelter 20 allows knee grip such that it is gripped by the rider's knees to stabilize the upper body. The shelter 20 further functions to cover the fuel tank or any parts, thereby providing a good appearance on the upper side of the vehicle body. Each side surface of the shelter 20 at its rear portion is formed as a knee grip portion 20a recessed inward of the shelter 20. Accordingly, the left and right knee grip portions 20a of the shelter 20 are adapted to be gripped by the rider's knees, thereby effecting the knee grip. The shelter 20 is also defined as a knee grip part in the present invention.

Left and right radiator side covers 21 are provided below the shelter 20 on the front side thereof. Left and right upper side covers 22 are detachably provided directly below the shelter 20 on the rear side thereof.

A lower cover 23 is provided below the radiator side covers 21 so as to cover the front lower portion of the engine 12. Left and right center side covers 24 are provided below the left and right upper side covers 22, respectively.

A front cowl 25 is provided so as to cover the front portion of the vehicle body, ranging from the headlight 15 to the left and right sides of the front portion of the shelter 20. The front cowl 25 functions to cover the front side of the vehicle and thereby straighten a running wind W sideward and upward during running of the vehicle in the condition where the rider straddles the seat 18 and operates the handlebar 14 on the front side. Left and right turn signals 26 are provided on the left and right sides of the front portion of the front cowl 25 in the vicinity of the headlight 15 on the rear side thereof.

Left and right air outlets 27 are provided on the left and right sides of the front cowl 25 in the vicinity of the left and right turn signals 26 on the rear side thereof, respectively. The left and right air outlets 27 function to sideward discharge the running wind W introduced from the front side of the front cowl 25.

Each air outlet 27 is formed at the intermediate position between the headlight 15 and the handlebar 14. Further, each air outlet 27 is formed on the front side of the half position of the longitudinal length L of each side surface of the front cowl 25. In other words, each air outlet 27 is located within the distance of L/2 from the headlight 15 toward the rear end of the front cowl 25.

A windshield 28 is provided at the front upper portion of the front cowl 25 so as to project upward and tilt rearward. The windshield 28 covers the front side of the handlebar 14 and it is formed of a suitable transparent resin. The windshield 28 has a smooth curved surface for making the running wind W flow upward and sideward, thereby preventing the running wind W from striking the rider.

Each cover and the shelter 20 mentioned above are formed of suitable materials, such as synthetic resin.

Figure 2:
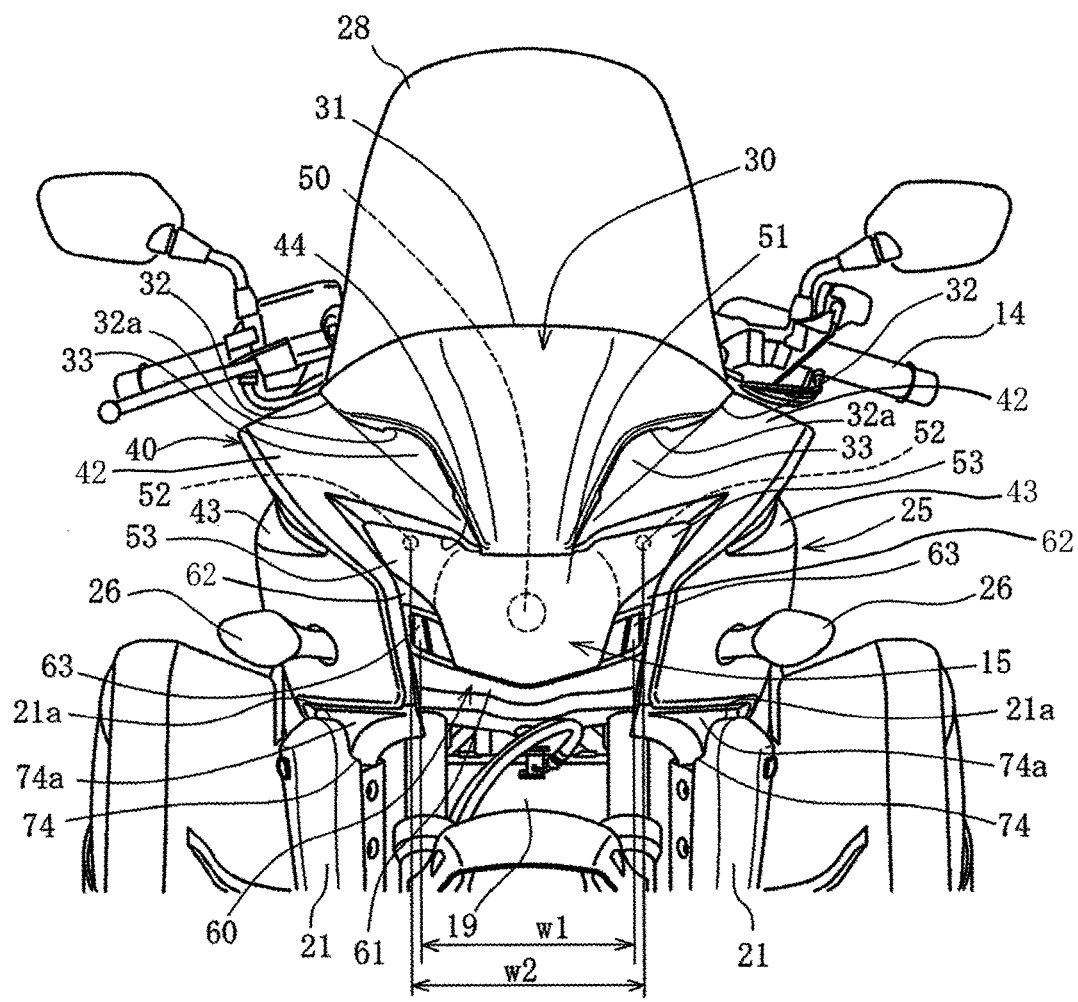
FIG. 2 is a front elevation of the vehicle.

FIG. 2 is a front elevation of the vehicle body. As shown in FIG. 2, the lower portion of the windshield 28 is covered with a shield cover 30. The shield cover 30 has a substantially inverted triangular shape as viewed in front elevation. The shield cover 30 is superimposed on a front surface 40 of the front cowl 25.

The shield cover 30 has an upper edge 31 laterally extending so as to be projected upward. The shield cover 30 has left and right side edges 32 extending obliquely upward from the lower ends so as to be gradually spaced apart from each other. The upper portion of each side edge 32 is formed as a recessed portion 32a recessed upward. An air inlet 33 for introducing the running wind W is formed between each recessed portion 32a and the front surface 40 located under the recessed portion 32a.

The front surface 40 is wider than the shield cover 30 in the lateral direction of the vehicle. The front surface 40 has left and right side portions 42 projecting laterally from the shield cover 30 and a superimposed portion located under the shield cover 30.

Both the shield cover 30 and the front surface 40 form a curved surface having an upper portion curved to extend rearward and left and right side portions curved to extend rearward, thereby making the running wind W flow rearward.

Each side surface of the front cowl 25 below the corresponding side portion 42 is formed with a wind guiding groove 43 having a substantially V-shaped section as viewed in front elevation. That is, the wind guiding grooves 43 on the left and right sides of the front cowl 25 open to the left and right sides as viewed in cross section. Accordingly, the wind guiding grooves 43 function to guide the running wind W from the front surface 40 of the front cowl 25 to the left and right side surfaces of the front cowl 25, thereby allowing smooth flows of the running wind W toward the rear end.

A light opening 44 is formed at a lower portion of the front surface 40 below the shield cover 30, and the headlight 15 is exposed to this light opening 44.

The headlight 15 is a combination light composed integrally of a headlight portion 51 at the central position and left and right position lights 53 at the upper left and right positions with respect to the headlight portion 51. The headlight portion 51 has a headlight bulb 50, and each position light 53 has a position light bulb 52. The left and right position lights 53 extend obliquely upward from the upper left and right portions of the headlight portion 51. The free end portion of each position light 53 is tapered to form an acute angle.

The lower portion of the light opening 44 is closed by a lower light cover 60. The lower light cover 60 is composed integrally of a spoiler portion 61 like a bar extending in the lateral direction and left and right duct portions 62 projecting upward from the left and right ends of the spoiler portion 61.

Each duct portion 62 is formed so as to close a recessed portion formed at the connected portion between the headlight portion 51 and the corresponding position light 53, wherein the lateral width of the headlight portion 51 is smaller than the distance between the left and right position lights 53. Further, each duct portion 62 is formed with an air inlet 63 for introducing the running wind W. The left and right air inlets 63 are formed on the left and right sides of the headlight portion 51 so as to open to the front side of the vehicle. The running wind W introduced from the left and right air inlets 63 is passed through the inside of the front cowl 25 to the left and right air outlets 27.

The duct spacing is defined as the distance w1 between the left and right air inlets 63, and the light spacing is defined as the distance w2 between the left and right position lights 53 (more specifically, the distance between the left and right position light bulbs 52), wherein the light spacing w2 between the left and right position lights 53 is greater than the duct spacing w1 (w1<w2).

Such a large spacing w2 between the left and right position lights 53 can be attained by widening the upper portion of the front surface 40 toward the left and right grip portions of the handlebar 14. By utilizing such a wide shape of the front surface 40, the left and right position lights 53 can be located with the large spacing w2, thereby improving the visibility.

The left and right air inlets 63 are formed on the left and right sides of the headlight portion 51 having a relatively small lateral width. Accordingly, the left and right air inlets 63 can be located with the relatively small duct spacing w1. As a result, the running wind W can be introduced from the left and right air inlets 63 in the vicinity of the lateral center of the vehicle where a high wind pressure is applied, and the running wind W straightened on the surface of the headlight 15 can be introduced into the air inlets 63 with less resistance and larger amount of air.

A radiator 19 is located below the headlight 15. The radiator 19 is located on the front side of the engine 12, below the shelter 20, and on the rear side of the front wheel 10. The radiator 19 has a laterally elongated rectangular shape as viewed in front elevation and has a small thickness as viewed in side elevation.

The left and right radiator side covers 21 are provided on the left and right sides of the radiator 19 and can straighten the running wind W to be introduced into the radiator 19 and the warm air flow passed through the radiator 19. Further, each radiator side cover 21 has an upper end 21a received in a recessed portion 74a formed at a lower edge portion 74 of the front cowl 25, thereby producing a feel of integration between each radiator side cover 21 and the front cowl 25 and an excellent design.

Figure 3:
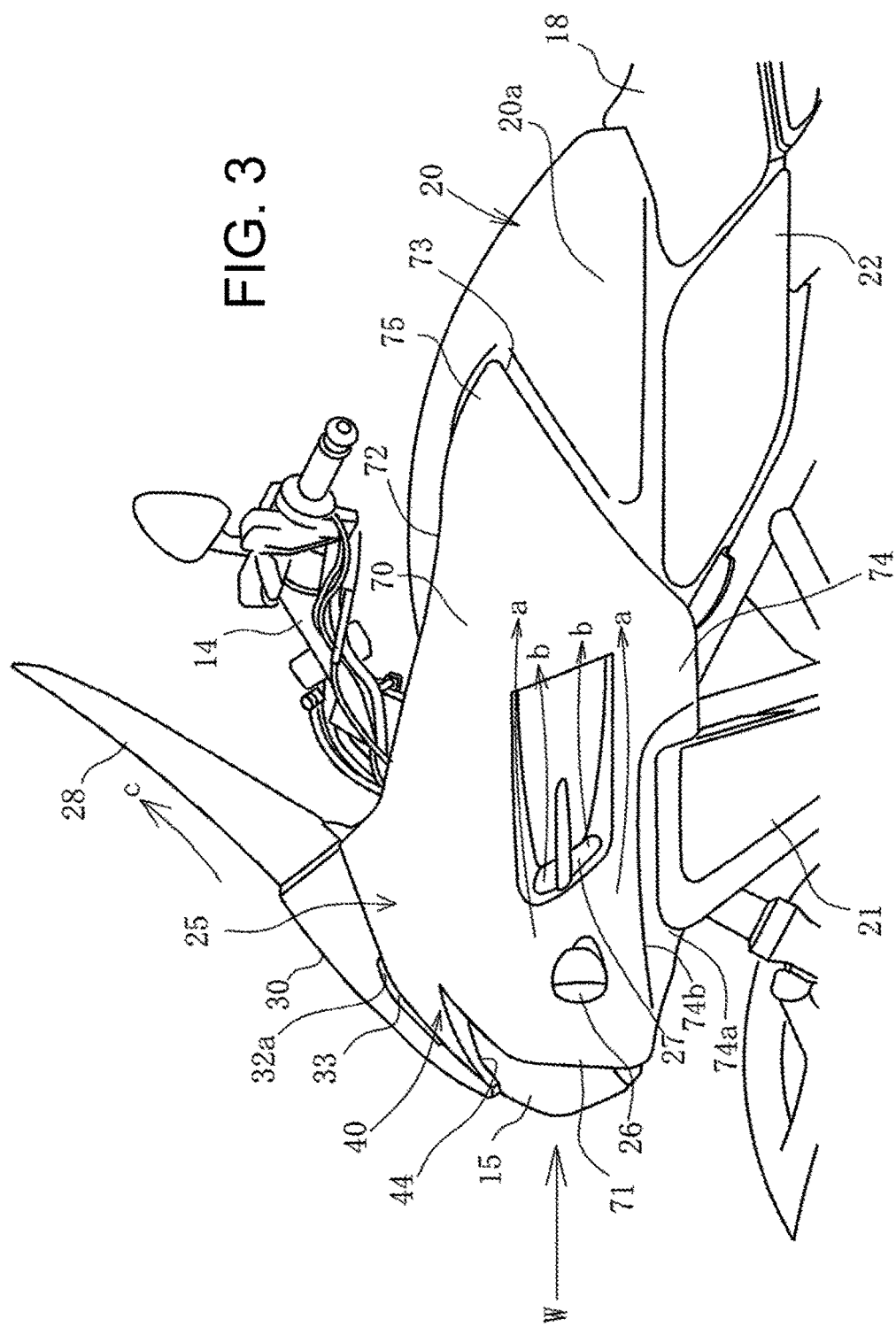
FIG. 3 is an enlarged side view of a front cowl and its related parts in the vehicle shown in FIG. 1.
Figure 4:
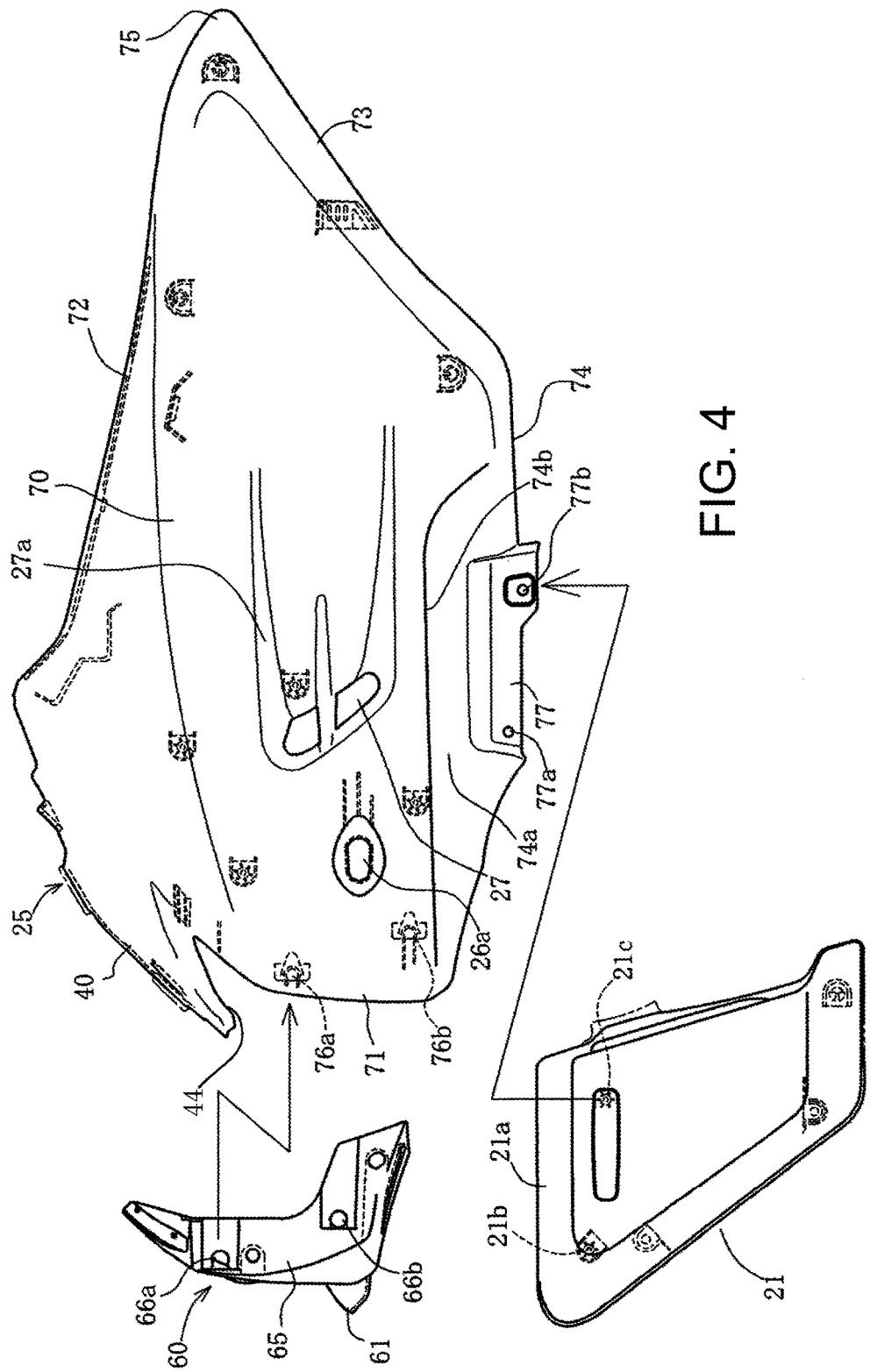
FIG. 4 is an exploded side view of the front cowl and its related parts.

FIG. 3 is an enlarged side view of the front cowl 25 and its related parts shown in FIG. 1, and FIG. 4 is an exploded side view of the front cowl 25 and its related parts.

As shown in FIGS. 3 and 4, the front cowl 25 has a substantially rhombic shape as viewed in side elevation. That is, the front cowl 25 has a body portion 70, front edge portion 71, upper edge portion 72, rear edge portion 73, and lower edge portion 74, wherein the body portion 70 is surrounded by the front edge portion 71, the upper edge portion 72, the rear edge portion 73, and the lower edge portion 74.

As shown in FIG. 3, the rear edge portion 73 is located so as to come into contact with each side surface of the shelter 20 and extend obliquely upward to the rear side as viewed in side elevation. The upper edge portion 72 and the rear edge portion 73 are joined at a rear end portion 75. The rear end portion 75 is located in the vicinity of the knee grip portion 20a of the shelter 20, so that the running wind W can be made to flow more effectively outside the rider's knees, thereby improving the ride comfort during running.

Each air outlet 27 is located on the just front side of the center of the body portion 70 and opens to the rear side of the vehicle.

A recessed portion 27a is formed on the just rear side of each air outlet 27, so as to make the running wind W flow smoothly toward the rear portion of the front cowl 25. The front side of the recessed portion 27a is formed by inclined surfaces inclined inward of the vehicle body to each air outlet 27.

As shown in FIG. 3, a part of the running wind W flows rearward along each side surface of the front cowl 25 as shown by arrows a. Further, another part of the running wind W is introduced from each air inlet 63 (see FIG. 2) formed near the headlight 15 into the inside of the front cowl 25, and thereafter discharged from each air outlet 27 to flow rearward as shown by arrows b. Further, another part of the running wind W flows upward along the front surface of the windshield 28 as shown by an arrow c.

As shown in FIG. 4, the front portion of the upper edge portion 72 forms the front surface 40, and the light opening 44 is formed in the range from the front surface 40 to the front edge portion 71.

The upper edge portion 72 extends long rearward and joins at the rear end portion 75 with the rear edge portion 73 extending obliquely upward.

Upper and lower engaging lugs 76a and 76b are formed on the inner surface of the front edge portion 71. These upper and lower engaging lugs 76a and 76b are respectively engaged with upper and lower engaging portions 66a and 66b formed on each side surface 65 of the lower light cover 60 inserted into the inside of the front edge portion 71.

A mounting hole 26a for each turn signal 26 is formed through the body portion 70 at a position on the just front side of the corresponding air outlet 27.

The front side of the lower edge portion 74 on each side of the front cowl 25 is formed with a recessed portion 74a recessed inward of the vehicle body, and an upper portion of each radiator side cover 21 is received in this recessed portion 74a. The upper edge 21a of each radiator side cover 21 comes close to the upper edge (shoulder portion) 74b of the corresponding recessed portion 74a. With this arrangement, the lateral distance between the left and right radiator side covers 21 can be reduced to thereby reduce the air resistance.

Further, each recessed portion 74a is formed with a connecting portion 77 for the corresponding radiator side cover 21. Each connecting portion 77 is formed with two mounting holes 77a and 77b. These mounting holes 77a and 77b are respectively engaged with two bosses 21b and 21c projecting from the inner surface of each radiator side cover 21 at its upper portion, thereby integrally mounting the left and right radiator side covers 21 to the front cowl 25.

Figure 5:
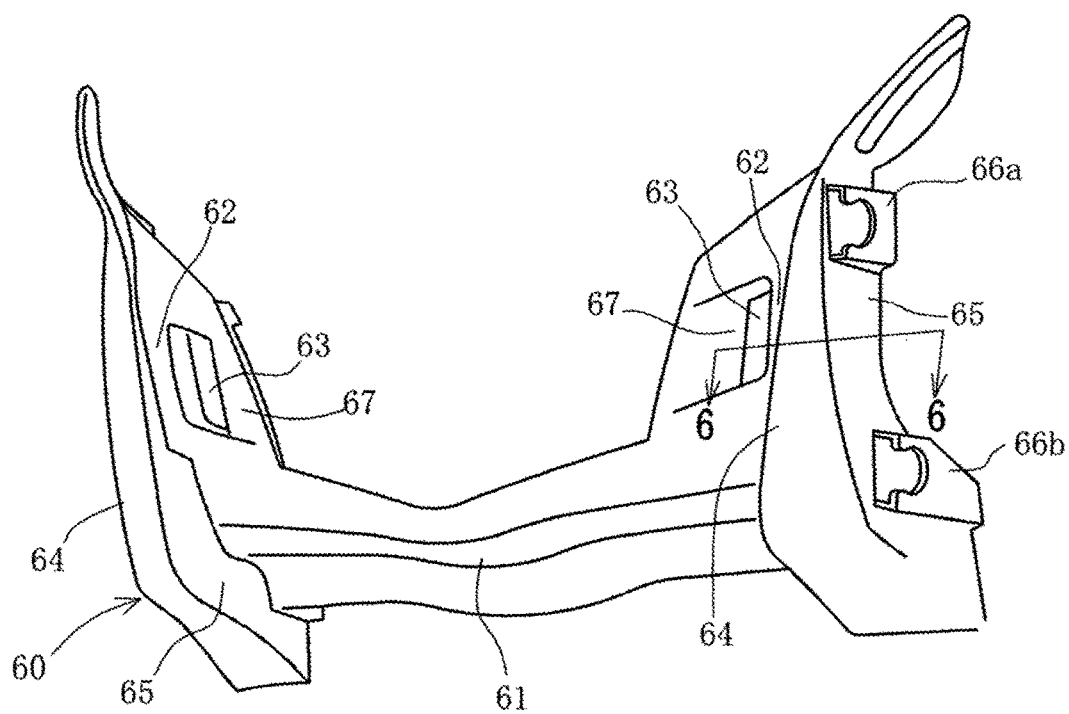
FIG. 5 is a perspective view of a lower light cover.
Figure 6:
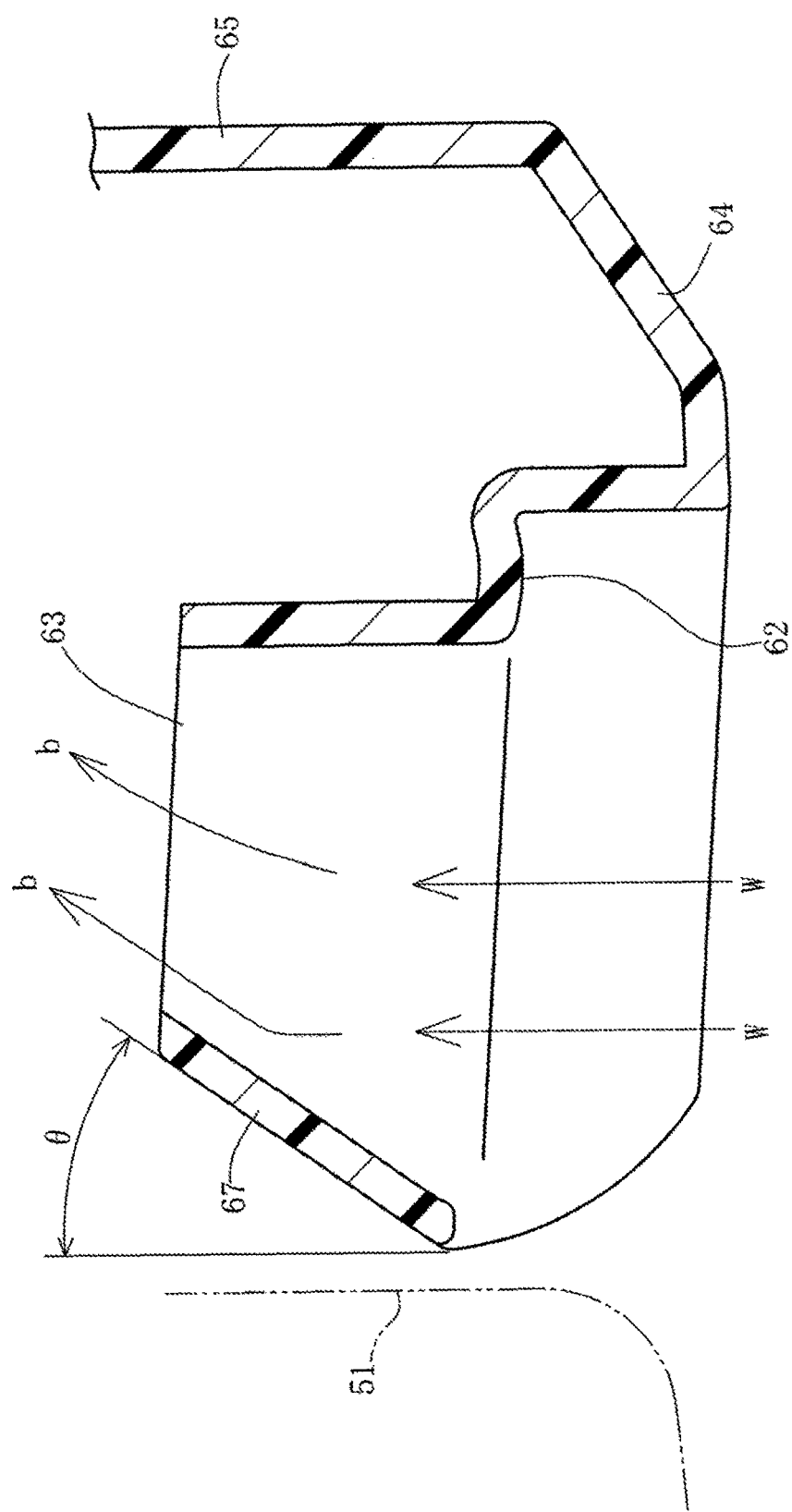
FIG. 6 is a cross section taken along the line 6-6 in FIG. 5.

FIG. 5 is a perspective view of the lower light cover 60, and FIG. 6 is a cross section taken along the line 6-6 in FIG. 5.

As shown in FIG. 5, the lower light cover 60 has a substantially H-shaped configuration as viewed in front elevation. The lower light cover 60 has a pair of left and right wall portions 64 extending vertically. The spoiler portion 61 extends horizontally so as to connect the left and right wall portions 64 at their lower portions. The left and right duct portions 62 project laterally inward from the left and right wall portions 64, respectively, between the spoiler portion 61 and the wall portions 64. The upper and lower engaging portions 66a and 66b are formed on the side surface 65 of each wall portion 64.

Each duct portion 62 is integrally formed with a beltlike guide portion 67 on the laterally inside of the corresponding air inlet 63, i.e., on the headlight portion 51 side. As shown in FIG. 6, each guide portion 67 is inclined laterally outward at an arbitrary angle θ with respect to the longitudinal center line of the vehicle body so as to be directed toward the corresponding air outlet 27 at the rear side.

Accordingly, the running wind W introduced into the left and right air inlets 63 from the front side of the vehicle body comes into contact with the left and right guide portions 67 and is guided by the guide portions 67 to flow laterally outward toward the left and right air outlets 27.

Each guide portion 67 functions as a part of a wall surface constituting a duct for leading the running wind W to the corresponding air outlet 27. Further, each guide portion 67 is located close to the corresponding side surface of the headlight portion 51.

The operation of this preferred embodiment will now be described.

As shown in FIG. 3, the running wind W is directed to the front side of the front cowl 25. Accordingly, the running wind W is separated to the right side and the left side of the front cowl 25 on the front surface of the headlight 15, so that the running wind W flows rearward along each side surface of the front cowl 25 as shown by the arrows a. Since each side surface of the front cowl 25 is formed as a smooth curved surface, the running wind W flows smoothly with less resistance.

A part of the running wind W is introduced from the left and right air inlets 63 (see FIG. 2) formed near the headlight 15 into the inside of the front cowl 25.

As shown in FIG. 6, this running wind W is guided by each guide portion 67 to flow laterally outward toward the corresponding air outlet 27 as shown by the arrows b. Thereafter, this running wind W is discharged from each air outlet 27 to the outside of the front cowl 25 (see the arrows b in FIG. 3).

At this time, the flow of the running wind W shown by the arrows b discharged from the inside of the front cowl 25 interferes with the flow of the running wind W shown by the arrows a flown along the outer surface of the front cowl 25 to cause turbulence.

Accordingly, although the running wind W shown by the arrows a is apt to stick to each side surface of the front cowl 25, this running wind W can be easily separated from each side surface of the front cowl 25.

Thus, the running wind W sticking to each side surface of the front cowl 25 can be separated by the running wind W passed through the inside of the front cowl 25 and discharged from each air outlet 27. Accordingly, the resistance to leaning of the vehicle body at the start of turning can be reduced to thereby improve the turning performance.

Further, a crosswind is introduced from each air outlet 27 formed at each side surface of the front cowl 25 and passed through the vehicle body in the lateral direction, thereby suppressing the influence of the crosswind and improving the running performance against the crosswind.

The resistance to leaning of the vehicle body can be reduced more by setting the position of separating the running wind W from each side surface of the front cowl 25 nearer to the front end of the front cowl 25. Accordingly, the running resistance can be effectively reduced by setting the position of each air outlet 27 to a position on the front side of the longitudinal central portion of the front cowl 25. In this preferred embodiment, specifically, each air outlet 27 is located on the front side of the middle position defined by the half of the distance L between the headlight 15 and the rear end portion 75 of the front cowl 25. Accordingly, the separation of the running wind W from each side surface of the front cowl 25 can be made more reliably and quickly.

Further, each guide portion 67 is formed on the headlight portion 51 side and inclined laterally outward toward the corresponding air outlet 27 at the rear side. Accordingly, the running wind W entering each air inlet 63 is guided by the corresponding guide portion 67 to flow laterally outward toward the corresponding air outlet 27. That is, the running wind W introduced from each air inlet 63 into the inside of the front cowl 25 can be guided to the corresponding air outlet 27. Furthermore, each guide portion 67 is used as a part of the wall surface of the duct. Accordingly, no special duct is necessary in the inside space of the front cowl 25 having a closed cross section, and the duct structure inside the front cowl 25 can be made simple.

As shown in FIG. 3, the rear end portion 75 of each side surface of the front cowl 25 is in contact with the shelter 20, and the rear edge portion 73 located in contact with the shelter 20 extends obliquely upward to the rear side as viewed in side elevation. Accordingly, the front cowl 25 can be extended rearward of the rider's knees as viewed in side elevation, so that the running wind W can be guided to flow more effectively outside the rider's knees, thereby improving the ride comfort during running.

The left and right air inlets 63 are formed on the left and right sides of the headlight portion 51 having a relatively small lateral width. Accordingly, the duct spacing w1 between the left and right air inlets 63 can be reduced, so that the running wind W can be introduced from the left and right air inlets 63 with less air resistance in the lateral central area where a high wind pressure is applied.

Further, the light spacing w2 between the left and right position lights 53 is set larger than the duct spacing w1 between the left and right air inlets 63. Accordingly, the left and right position lights 53 can be located with the large spacing w2, thereby improving the visibility.

The left and right turn signals 26 projecting outward from the left and right side surfaces of the front cowl 25 are located on the front side of the left and right air outlets 27, respectively. Accordingly, the left and right turn signals 26 can be located at the front portion of the vehicle, thereby improving the visibility. In addition, the wind discharged from the air outlets 27 is not hindered by the turn signals 26, but can be made to flow smoothly.

As a result, the separation of the running wind W from each side surface of the front cowl 25 can be made more reliably.

Each side surface of the front cowl 25 is formed with the recessed portion 74a recessed inward of the vehicle body. Accordingly, the lateral distance between the left and right radiator side covers 21 can be reduced to thereby reduce the air resistance.

Furthermore, the left and right radiator side covers 21 are provided on the left and right sides of the radiator 19 to straighten the running wind W to be introduced into the radiator 19 and the warm air flow passed through the radiator 19. Further, the upper edge 21a of each radiator side cover 21 is received in the recessed portion 74a of each lower edge portion 74 of the front cowl 25 so as to come close to the upper edge 74b, thereby producing a feel of integration between each radiator side cover 21 and the front cowl 25 and an excellent design.

The running wind passed under the lower surface of the front cowl 25 serves to cool the radiator 19, and there is a case that a part of this running wind is not taken into the radiator 19 from the front surface thereof, but changes its running direction upwardly to stay inside the front cowl 25.

In such a case that the running wind stays inside the front cowl 25, a force floating the front cowl 25 is generated to cause a disturbance in running stability of the vehicle.

Even in this case, the running wind introduced from the air inlets 63 on the front side of the front cowl 25 functions to discharge the running wind staying in the front cowl 25 from the air outlets 27. Accordingly, the force floating the front cowl 25 can be reduced to thereby improve the running stability of the vehicle.

The present invention is not limited to the above preferred embodiment, but various modifications and applications may be made within the scope of the present invention. For example, the knee grip part may be provided by a fuel tank rather than the shelter 20. Further, the knee grip part may also be provided by a cover part such as a side cover and a radiator shroud.

DESCRIPTION OF REFERENCE SYMBOLS

15: Headlight, 20: Shelter, 20a: Knee grip portion, 21: Radiator side cover, 25: Front cowl, 26: Turn signal, 27: Air outlet, 60: Lower light cover, 63: Air inlet, 67: Guide portion.

What is claimed is:

1. A saddle ride type vehicle comprising:
    a knee grip part adapted to be gripped by the knees of a rider; and
    a front cowl for covering a front side of said vehicle to straighten a running wind,
    wherein each side surface of said front cowl extends from the front side of a handlebar to said knee grip part in the longitudinal direction of said vehicle;
    the front portion of said front cowl is provided with left and right air inlets for introducing a part of said running wind;
    the left and right side surfaces of said front cowl are formed with left and right air outlets located on each side surface of said front cowl and on the rear side of said left and right air inlets, respectively, each air outlet is spaced from a lower edge portion of each side surface, wherein each side surface includes a recessed portion formed by forward, upper and lower inclined surfaces inclined laterally inward to each air outlet, the upper and lower inclined surfaces of each recessed portion have a length in a longitudinal direction of said vehicle greater than a height of each air outlet as viewed in side elevation and flank a section of each side surface that is rearward of and inclined laterally inward to each air outlet,
    wherein the front portion of said front cowl surrounds a headlight;
    said left and right air inlets are formed on the left and right outer sides of said headlight; and
    each air inlet is provided with a guide portion formed on a headlight cover for guiding said running wind introduced into each air inlet laterally outward toward the rear side, said guide portion being located laterally inside of the corresponding air inlet near said headlight and inclined laterally outward with respect to a longitudinal center line of the vehicle so as to be directed toward the corresponding air outlet at a rear side,
    wherein each recessed portion is formed at an intermediate position between the headlight and the handlebar,
    wherein left and right turn signals project through mounting holes formed in the left and right side surfaces of said front cowl, each mounting hole located between the upper and lower inclined surfaces of each recessed portion as viewed in side elevation; and
    said left and right turn signals are located on the front side of said left and right air outlets, respectively, and are aligned with said left and right air outlets, respectively, in a height direction of said vehicle.

2. The saddle ride type vehicle according to claim 1, wherein each air outlet is located on the front side of a middle position defined by half of the longitudinal length of each side surface of said front cowl.

3. The saddle ride type vehicle according to claim 2, wherein a rear end portion of each side surface of said front cowl is in contact with said knee grip part, and a rear edge portion located in contact with said knee grip part extends obliquely upward to the rear side as viewed in side elevation.

4. The saddle ride type vehicle according to claim 2, wherein said front cowl has a front surface located on the front side of said handlebar so as to be widened laterally toward the opposite ends of said handlebar;
    said left and right air inlets are formed on the left and right sides of a headlight portion of said headlight;
    said headlight includes left and right position lights extending upward; and
    the spacing between said left and right position lights is set larger than the spacing between said left and right air inlets.

5. The saddle ride type vehicle according to claim 2, comprising:
    a radiator located on the front side of an engine located below said knee grip part,
    wherein said radiator has a rectangular shape as viewed in front elevation and has a small thickness as viewed in side elevation;
    left and right radiator side covers are provided on the left and right sides of said radiator, respectively, so as to straighten said running wind to be introduced into said radiator and a warm air flow passed through said radiator; and
    each radiator side cover has an upper end, as viewed in side elevation, overlapped with each side surface of the front cowl which has a recessed portion for receiving each radiator side cover on the side surface thereof.

6. The saddle ride type vehicle according to claim 1, wherein a rear end portion of each side surface of said front cowl is in contact with said knee grip part, and a rear edge portion located in contact with said knee grip part extends obliquely upward to the rear side as viewed in side elevation.

7. The saddle ride type vehicle according to claim 6, wherein said front cowl has a front surface located on the front side of said handlebar so as to be widened laterally toward the opposite ends of said handlebar;

said left and right air inlets are formed on the left and right sides of a headlight portion of said headlight;

said headlight includes left and right position lights extending upward; and the spacing between said left and right position lights is set larger than the spacing between said left and right air inlets.

8. The saddle ride type vehicle according to claim 6, comprising:

a radiator located on the front side of an engine located below said knee grip part, wherein said radiator has a rectangular shape as viewed in front elevation and has a small thickness as viewed in side elevation;

left and right radiator side covers are provided on the left and right sides of said radiator, respectively, so as to straighten said running wind to be introduced into said radiator and a warm air flow passed through said radiator; and each radiator side cover has an upper end, as viewed in side elevation, overlapped with each side surface of the front cowl which has a recessed portion for receiving each radiator side cover on the side surface thereof.

9. The saddle ride type vehicle according to claim 1, wherein said front cowl has a front surface located on the front side of said handlebar so as to be widened laterally toward the opposite ends of said handlebar;

said left and right air inlets are formed on the left and right sides of a headlight portion of said headlight;

said headlight includes left and right position lights extending upward; and a spacing between said left and right position lights is set larger than a spacing between said left and right air inlets.

10. The saddle ride type vehicle according to claim 1, comprising:

a radiator located on the front side of an engine located below said knee grip part, wherein said radiator has a rectangular shape as viewed in front elevation and has a small thickness as viewed in side elevation;

left and right radiator side covers are provided on the left and right sides of said radiator, respectively, so as to straighten said running wind to be introduced into said radiator and a warm air flow passed through said radiator; and each radiator side cover has an upper end, as viewed in side elevation, overlapped with each side surface of the front cowl which has a recessed portion for receiving each radiator side cover on the side surface thereof.

* * * * *